United States Patent [19]
Gille

[11] Patent Number: 5,874,964
[45] Date of Patent: Feb. 23, 1999

[54] METHOD FOR MODELING ASSIGNMENT OF MULTIPLE MEMBERSHIPS IN MULTIPLE GROUPS

[75] Inventor: J. Bernard Gille, Lindon, Utah

[73] Assignee: Ungermann-Bass, Inc., Santa Clara, Calif.

[21] Appl. No.: 734,374

[22] Filed: Oct. 17, 1996

Related U.S. Application Data

[60] Provisional application No. 60/006,524, Oct. 19, 1995.

[51] Int. Cl.$^6$ .................................................. G06F 3/14
[52] U.S. Cl. ............................ 345/356; 345/348; 345/969
[58] Field of Search ................................ 345/343, 340, 345/346, 356, 357, 339, 326, 335, 961, 969, 348; 364/188, 146

[56] References Cited

U.S. PATENT DOCUMENTS

| | | | |
|---|---|---|---|
| 4,823,338 | 4/1989 | Chan et al. ............................... | 370/85 |
| 5,261,044 | 11/1993 | Dev et al. ............................... | 395/159 |
| 5,295,242 | 3/1994 | Mashruwala et al. ................... | 345/356 |
| 5,394,402 | 2/1995 | Ross ....................................... | 370/94.1 |
| 5,515,488 | 5/1996 | Hoppe et al. ........................... | 345/440 |

*Primary Examiner*—Matthew M. Kim
*Assistant Examiner*—Crescelle N. Dela Torre
*Attorney, Agent, or Firm*—Townsend and Townsend and Crew

[57] ABSTRACT

Collections of articles or entities are represented on a video display in a manner that allows one to view the relationship, if any, between those articles. One embodiment uses circular representations to model set membership of the entities in one or more of the collections. Another embodiment displays many-to-many and one-to-many relationships between the entities and the collections using two overlapping sets of connective representations with icons displayed at the overlaps to indicate the relationship.

7 Claims, 7 Drawing Sheets

METHOD FOR MODELING ASSIGNMENT OF MULTIPLE MEMBERSHIPS IN MULTIPLE GROUPS

This application claims benefit of provisional application Ser. No. 60/006,524, filed Oct. 19, 1995.

BACKGROUND OF THE INVENTION

The present invention is directed generally to displaying information on a video display screen. In particular, the invention pertains to a method of modeling and visualizing sets of many interconnected or interrelated elements in an ordered or related fashion—such as entry connections (i.e., ports) of a local area network.

Recent advances in the computing arts have brought with then an explosion in the uses that can be put to computing equipment particularly in the field of information science. Computing equipment available today provide the capability of gathering, manipulation, classification, storage, and retrieval of recorded knowledge of various kinds and types. The speed and capability of today's computing equipment provides a tool for huge amounts of information storage and retrieval. In fact, relative little computing power (using today's standards) may be needed to systematically collect, catalog, and store huge amounts of information for high-speed, selective retrieval in such diverse fields as banking, law-enforcement, jurisprudence, education, and medicine, to name a few. However, with this capability often brings with it the problem of presenting or otherwise displaying the information, which may often include many interrelated sets of constituent knowledge, in some logical and understandable manner that quickly and easily provides the information needed without time-consuming analysis. For example, in the field of education, a university will develop and maintain a record of each of its students, detailing classes in which the student is enrolled, the times of the classes, classes that have been completed by the student, etc. Similarly, records for each of the university's professors may be kept, identifying the class subjects being taught that semester (or quarter), the times of the classes, and how many and what students are in each class. This information may not be for the current period, but for past teaching periods. Now suppose one would like to see what students share what classes, or what professors share what students during any period of time. Certainly, as is done at present, lists of the professors and their students during the time period in question can be presented for viewing, allowing one to sift through the lists to find what is desired. However, this can be a time-consuming task that may become daunting as the number of lists becomes larger.

Another field in which interrelated pieces of information is often needed and used is in networks in which numbers of data processing elements are communicatively connected. Recent advances in the networking art now permit so-called "virtual" networks to be formed, increasing not only the number of "collections" of interconnected elements or devices, but also the elements included in such collections. Further, virtual network technology provides a "mobile" network in that it is easier to move devices from one collection to another. An example of such virtual network technology can be found in U.S. Pat. Nos. 4,823,338 and 5,394,402.

Networks, as is well known, are capable of interconnecting and communicating large numbers of individual data communicating devices (workstations, printers, communication devices, etc.) to one another. However, regardless of size, all networks must have some management. Even small local area networks (LAN) need someone to keep the system functional and up-to-date, including troubleshooting the network should problems occur, and/or assigning user passwords and identifications. As networks become larger, the task of network management can become daunting because of the difficulty of a person responsible for network management to visualize the necessary interrelations between the elements and devices of the network. The task is exacerbated by the explosive developments in recent years in the field of local area (and wide area) networks, providing the communicative interconnection between much larger numbers of data communicating devices than previously.

One recent development that further complicates network management tasks has been implementation of the concept of "virtual" networks. Systems implementing this concept are capable of assigning, on a port-by-port basis, groups of one or more ports (and, thereby, the data communication devices connected to each such port) to one or another of a number of virtual networks. For example, picture a network switch having ports a, b, c, and d that respectively connect to groups of data communicating devices A, B, C, and D by corresponding media segments (i.e., communication links). Each port may be assigned to one of a number of virtual networks. Accordingly, assume ports a and c may be assigned to virtual network VN 1 while the ports b and d are assigned to virtual network VN 2. Thereby the data communicating devices of groups A and C become members of VN 1, while those of group B and D are members of VN 2. Data communication from one member of the VN 1 to another member of that virtual network will be filtered so that only members of VN 1 can "see" that communication while members of VN 2 do not. Conversely, communications between member devices of VN2 are withheld from the devices of VN1.

While the ability to assign data communicating devices interconnected via such virtual network architecture may have a number of advantages, it can impose severe responsibilities upon a network manager charged with the task of keeping track of which device is a member of which virtual network, and of re-assigning members from one to another of the virtual networks.

A twist on such virtual network architecture is the ability to subdivide a virtual network into "workgroups." Ports of a device employing this aspect are assigned to one virtual network and one or more workgroups. Members of workgroups can communicate only with other members of that same virtual network and workgroup. A member of one workgroup can also be a member of another workgroup—of that same virtual network. Members of a workgroup can communicate only with members of that same workgroup. A port can also be assigned membership in several workgroups, in which case data communicating devices connected to that port can communicate to communicating devices of the several workgroups.

It can be seen, therefore, that a person charged with managing such a virtual network architecture, particularly one of any size, may be severely tasked to keep track of what devices are situated where. Such a person's tasks can be made easier if they could visualize or be provided with a displayed model of the network, and use that model to conduct assignments and/or reassignments of network device groups to one or more workgroups as the case may be.

SUMMARY OF THE INVENTION

Broadly, the invention provides a method of simply and effectively presenting information concerning a plurality of constituent parts of a larger grouping of whatever type and their relationships in a manner that allows one to quickly and easily discern those relationships. Many times, as has hereinabove indicated, numbers of related, but individual elements, entities, or "things" are variously grouped according to different criteria, and the grouping can change as the criteria changes. For example, students in a university can be grouped according to the professors they share (one criteria), or according to classes (a second criteria), according to who is in class at a certain time of day (a third criteria), and so on. Given a specific criteria, the invention is capable providing information respecting the entity interrelations and groupings according to the criteria is at least two basic formats: a "containment" view that allows one to view overlapped membership and other group relationships between members of two or more groups at a glance, and a "many-to-many" view that provides information of collections of elements/entities and their relationships.

The invention is illustratively described in the context of a networking environment to provide visual representations of the component parts (e.g., workstations, etc.) of the network in a logical and effective manner. The environment used is a network of the type capable of partitioning groups entry points to the network (i.e., "ports"), and thereby the network devices that connect to each port, to one or more of a number of virtual networks and, within each virtual network, one or more "workgroups." The network information is presented on a video display screen of, for example, a personal computer or work station performing network management operations.

According to one embodiment, the invention presents information respecting collections of network devices in sub-windows of a larger window. The sub-windows display information related to that displayed in the other sub-windows. One sub-window displays geometric shapes representing collections or groupings, each corresponding to a particular one of the workgroups of the network. The geometric shapes may overlap, and the overlapping areas may indicate that there are members of the overlapping workgroups. Using a conventional pointing device (e.g., "mouse") as is often used with graphical interfaces using windowing, a pointer may be moved on the display screen to a superimposed relation with one of the workgroup representations, or the intersection of overlapping workgroups. Using a button as is customarily found on such pointing devices, a "point and click" selection of a workgroup representation can be made, and the selection highlighted. Displayed in the other of the sub-windows are the members of the highlighted workgroup(s). If the highlighted portion is an overlapping area, the second window portion displays the identification of ports that are member of the selected workgroups. Yet another of the sub-windows will display the identifications of ports that have membership in at least one of the selected workgroups.

Another feature of above-described embodiment of the invention is that, using displayed port identifications, conventional "drag-and-drop" operations can be used to change a port's workgroup membership in much the same way the Microsoft Windows NT windowing program uses that operation to move files from one directory ("folder") to another.

In another embodiment of the invention, a "many-to-many" display is provided to show a number of possible element collections in one window portion, members and prospective members (i.e., elements) of the collections are shown in another window portion, and two sets of interconnective "pipe" representations are shown in a third window portion. Each of one set of the interconnective pipe representations correspond to each of the collections, and each of the other set of pipe representations corresponds to each of the members. The two sets of pipe representations are arranged to intersect, and icons at the intersections illustrate the interrelationship between the elements and the collections, i.e., which elements are members of which set or sets. This embodiment of the invention allows one to view at a glance which elements are members of which collections. A further advantage of this embodiment is that the window portions for used to identify the collections and the elements can be located so that text material (i.e., identifying nomenclature) is horizontally positioned and, therefore, easily readable, rather than vertically oriented text which is more difficult to read.

A number of advantages are achieved by the visualization provided by the present invention. First, one is capable of determining which parts of a larger collection of related articles (e.g., a network) are members of which workgroups. This visualization of membership, in turn, provides a mode for easily changing a port's membership.

These, and other, advantages and features of the present invention may be obtained from a reading of the detailed description of the invention, which should be taken in conjunction with the accompanying drawings.

DETAILED DISCUSSION

As indicated above, the present invention provides a visualization of network portions to a person operating at a network management station of a, for example, local area network (LAN). The invention is structured to run under a windowing operating system such as Microsoft Windows NT or Microsoft Windows 95. (Microsoft, Microsoft Windows NT, Microsoft Windows 95 are trademarks of Microsoft Corporation) although other windowings systems can also be used (e.g., OS/2 from IBM Corporation). Also, the present invention preferably incorporates use of a pointing device (e.g., a "mouse" in current vernacular) capable of moving a pointer display or icon on a video display screen. Standard "point-and-click" techniques are employed in which the pointing device is used to move the pointer on a display screen in overlapping or juxtaposed relation with other information (e.g., a geometric shape, the identity of a member of a workgroup, etc.) displayed on the video display screen, and clicking (depressing) a button on the pointing device to make a selection. The selected information is highlighted in some way on the display screen to show the selection.

The pointing device and display pointer is also used to perform conventional "drag-and-drop" operations. The drag-and-drop operation is employed in Microsoft Windows NT or Microsoft Windows 95, for example, to move (drag) files from one directory to another (where it is "dropped").

As those skilled in this art will soon recognize upon further reading of this disclosure, the present invention is particularly useful in showing collections of articles a video display in a manner that allows one to view the relationship, if any, between those articles. Although the invention is described in terms of its use for network management, and therefore used to show the relationships of the network elements, it will become apparent that the invention can find practical use in other fields.

Figure 1:
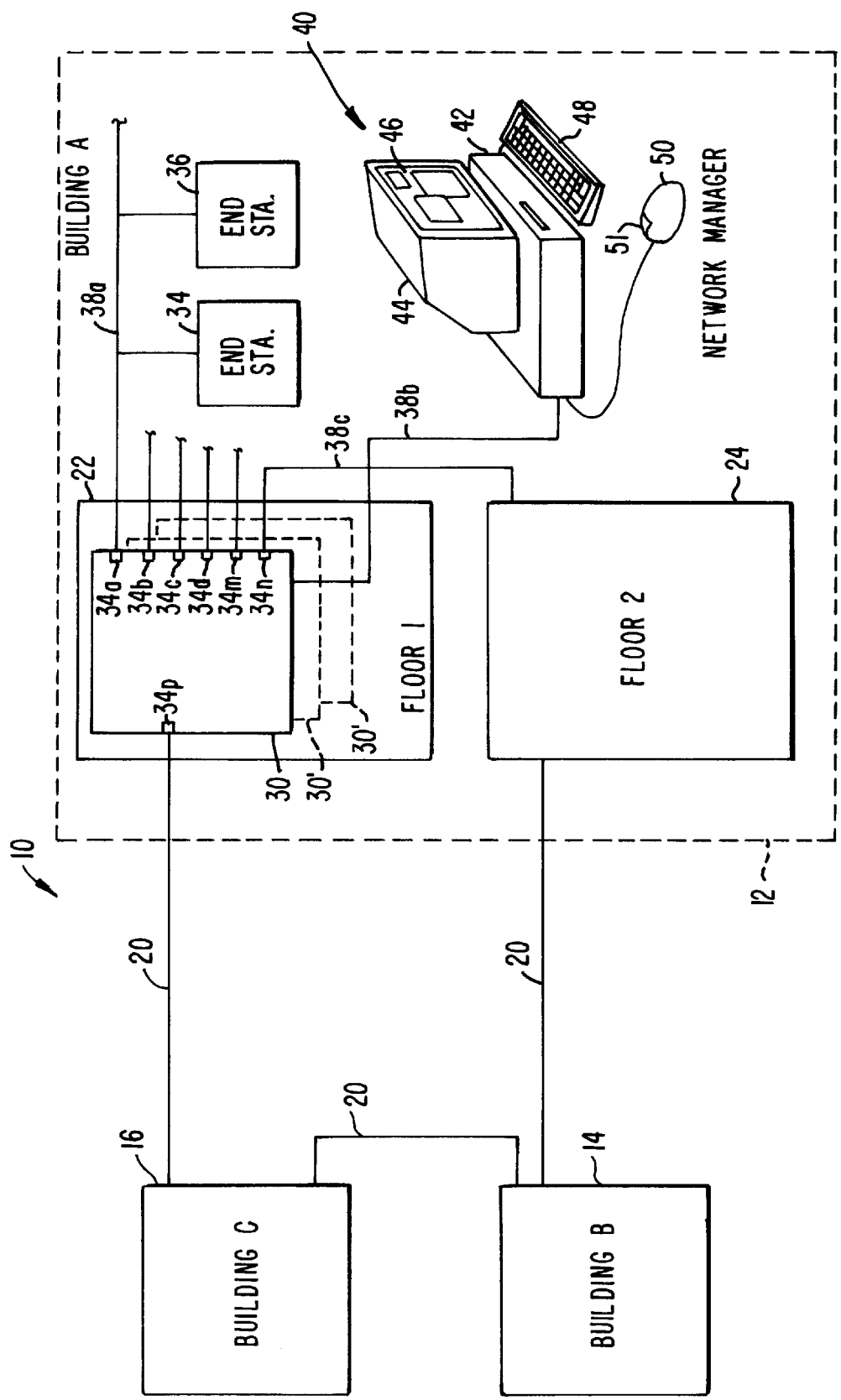
FIG. 1 is a representation of a network that may be visualized by the present invention.

Referring now to FIG. 1, illustrated is a network 10 that includes three separate local network sites or locations 12, 14, 16 which represent three buildings (labelled buildings A, B and C). The network locations 12–16 are conventionally interconnected by an appropriate communication medium (i.e., wires, cables, or the like). While not identical, each of the network locations 12–16 are substantially similar in that each includes a number of communication ports (provided by switches, routers, bridges, and like network connective devices) that connect to one or more data communicating devices (endstations) by a wiring segment. For purposes of illustration, the network location 12 is shown as including a pair of data communicating network switch enclosures 22, 24. Network locations 14, 16 may also include one or more such switch enclosures or other connective media.

The switch enclosures (labelled Floor 1 and Floor 2) 22, 24 include one or more switch modules 30 such as illustrated with respect to the enclosure 22. In fact, FIG. 1 shows enclosure 22 as having one module 30, and empty spaces for accepting additional switch modules (illustrated in phantom) 30'.

Each switch module has sixteen individual ports $34_a$, ..., $34_p$ (only 7 of which, $34_a$, $34_b$, $34_c$, $34_d$, $34_m$, $34_n$, and $34_p$) are shown in FIG. 1. Each port connects to a communication segment (e.g., signal line) that, in turn, connects to one or more endstations, such as endstations 34 and 36 that connect to port $34_a$ by the segment $38a$.

In implementation, the enclosures 22, 24 are constructed to include a backplane structure (not shown) to interconnect the switch modules 30 of that enclosure, communicating them to one another so that, in effect, the enclosure 22, for example, can form a 16 by N port switch if all available (N) switch module connections are filled. (In implementation, N is 8, but could be any number.)

As FIG. 1 also illustrates, the network location 12 includes a dedicated endstation, designated with the reference numeral 40, as a network manager station, connected to one of the (16) ports of switch module 30 by segment $38b$. Although, it should be evident to those skilled in this art that rather than dedicating one endstation to network management, one could log on to the network 10 at any location for effecting network management functions provided the location had sufficient facilities. In any event, network management station 40 is structured to include a central processor unit (CPU) 42, monitor 44 with, of course, a display screen 46, a keyboard 48, and a pointing device 50, here shown as a conventional "mouse" (as such devices are known in present vernacular) with a depressible button 51. Although the pointing device 50 is illustrated as a mouse, it will be evident that other pointing devices may be used.

The pointing device 50 allows one to move a "pointer" (usually an icon in the shape of an arrow) on the display screen. As is common, and as used in the present invention, the depressible button 51 of pointing device 50 can used (when depressed and released) to make a "point-and-click" selection of information presented on the display screen 46, or depressed and held for selecting and moving ("drag and drop") visual objects presented for viewing on the display screen 46.

The other enclosure 24 (represented, as FIG. 1 shows, as being located on Floor 2 of Building A) could be similarly structured in that it would include one or more switch modules (not shown) connecting end stations (not shown) of various type to the network 10. Similarly, the network locations 14 and 16 may be constructed to have one or more switch modules contained in one or more enclosures.

As mentioned, the network 10, or at least the network location 12, is structured to implement virtual network architecture (VNA). VNA, as explained, allows a network to be subdivided into "virtual" networks on a port-by-port (i.e., segment-by-segment) basis. For example, the ports $38_a$, $38_m$, and $38_n$ of the module 30 could be assigned to a virtual network "1" while the other ports of the module (and/or other modules) are assigned to one or more other virtual networks. This is accomplished by assigning each port a virtual network architecture identifier (VNA ID). All incoming message traffic received at a port will have associated with it the VNA ID of that port, and that associated VNA ID stays with that message traffic until sent out an outgoing port.

There are a number of ways that VNA can be implemented. For example, some conventional network connective devices use store and forward techniques, and it would be a simple matter to assign VNA ID information to the ports, assigning the VNA ID of the port at which message traffic is received to that message traffic, and comparing that assigned value to the VNA ID of any port selected to transmit the message traffic. Thus, the implementation of VNA can be done entirely in software, or a combination of software and hardware. Representative of prior VNA techniques are found in U.S. Pat. Nos. 4,823,338 and 5,394,402.

Figure 2:
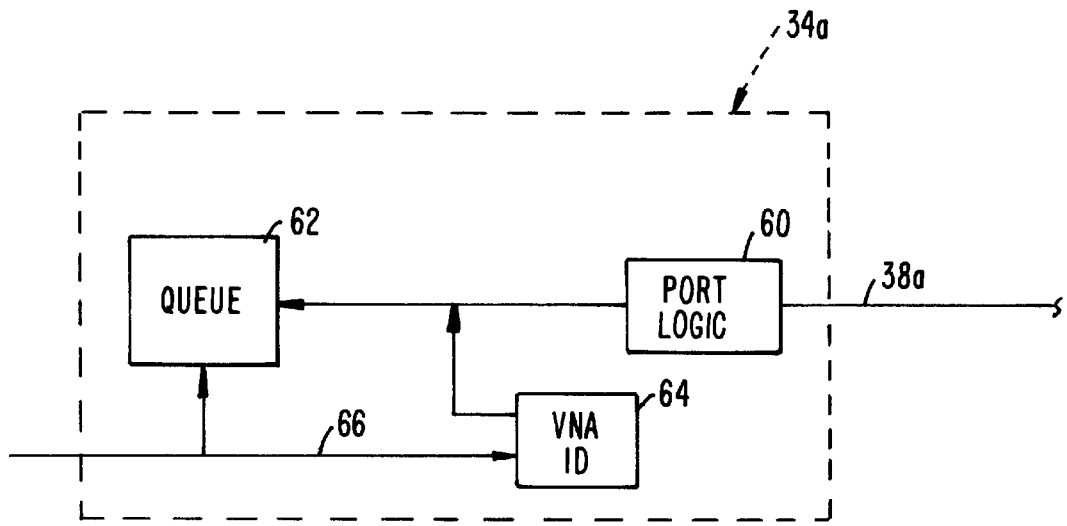
FIG. 2 is a representation of the input logic at one of the ports of the network of FIG. 1, whereat a virtual network identification attaches to communications.

Another approach to VNA implementation is shown in FIG. 2 which illustrates the port $34_a$ as being connected to the wiring segment $38_a$ by port logic 60. Port logic 60 implements the functions of receiving message traffic from, or transmitting message traffic to, the wiring segment $38_a$ to which it connects, here wiring segment $38_a$. Port logic 60 would also include the necessary logic to de-serialize incoming message traffic and pass it to a storage facility such as queue 62, or serialize message traffic received from the queue 62 for transmission onto the segment $38_a$. Associated with the port $34_a$ is a VNA ID register 64 that is accessible to the network management station. The VNA ID register 64 contains the VNA ID assigned to the port $34_a$.

Digressing, the port 34a is shown in FIG. 2 in representative form for purposes of ease of illustration. In implementation both the queue 62 and the VNA ID register may be found in a memory shared by all other ports 34 of a switch module 30.

Figure 3:
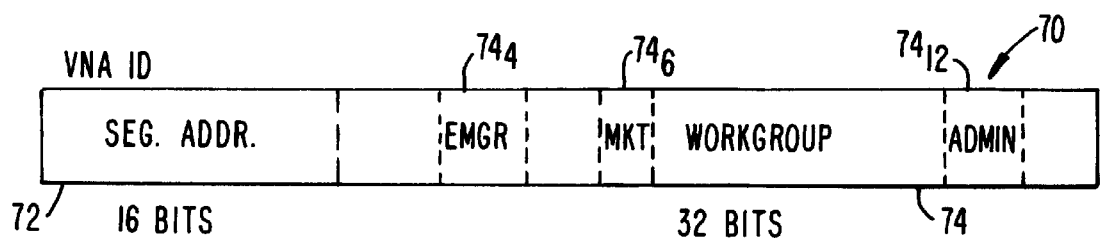
FIG. 3 is a representation of the virtual network identification.

The VNA ID is a 48-bit word 70 the structure of which is shown in FIG. 3. The VNA ID word 70 is divided into two fields: a 16-bit segment address field 72, and a 32-bit workgroup field 74. The 16-bit segment field identifies the particular VLAN to which the port is assigned. Within any VLAN there may be one or more (up to 32) workgroups, and a port may be assigned to any one or more of the workgroups of the VLAN to which it belongs. For example, assume that some, but not all, of the ports, including ports $34_a$, $34_b$, $34_c$, $34_d$ $34_m$, and $34_n$ of the switch module 30 are assigned to VNA ID that identifies them as members of a virtual (local area) network "VLAN 1." All other ports of the module 30 (as well as ports of other modules, whether of enclosure 22, enclosure 24, or network locations 14, 16) are assigned to one or more other VLANs. The segment address field 72 of the VNA ID associated with each of the ports $34_a$, $34_b$, $34_c$, $34_d$, $34_m$, $34_n$, would be the same, but different from that of any other port in the network not assigned to VLAN 1.

Now, assume that it is desired the VLAN 1 be divided into three workgroups: Engineering, Marketing, and Administration. Predetermined bit locations of the workgroup field 74 of the VNA ID word 70 would correspond to these workgroups so that if set to one state (e.g., a logic ONE) the associated port is assigned membership in that workgroup (of that VLAN). Let's assign ports $34_a$, and $34_c$ to the Engineering workgroup of VLAN 1. One of the bit locations (e.g., bit location $72_4$) of the workgroup field 74 would be set accordingly in the VNA ID for each of those ports. Now we will assign ports $34_b$ and $34_n$ to the Marketing workgroup by setting the bit location $74_6$ accordingly. Let's now assign the ports $34_d$ and $34_m$ to the Administration workgroup with bit location $74_{12}$.

Workgroup assignment is accomplished by the network management station 40 by writing to the VNA ID registers 64 of each of the ports $34_a$, $34_b$, $34_c$, $34_d$, $34_m$, and $34_n$ a VNA ID in which the segment addresses will be the same, identifying them as being assigned membership in the VLAN 1. The workgroup fields, however, for the ports $34_b$ and $34_n$ will differ from that of ports $34_a$, and $34_c$ in that the workgroup fields of the VNA ID of ports $34_b$ and $34_n$ will have the bit $74_6$ set to identify them as members of the marketing workgroup, while bit $74_4$ of the workgroup field for the VNA ID associated with ports $34_a$ and $34_c$ is set to identify them as members of the Engineering workgroup. The ports $34_d$ and $34_m$ will have bit $74_{12}$ set to identify their membership in the Administration group.

Message traffic from a member of a particular workgroup of VLAN 1 will be "seen" only by the other members of that virtual network, and particular workgroup. To put it another way, a member of a particular VLAN and workgroup can send message traffic only to members of that same VLAN and workgroup. For example, assume that an end station on wiring segment $38_a$, a member of the Engineering workgroup of VLAN 1, sends message traffic bound for another member of that same VLAN and workgroup located on the segment connected to the port $34_c$. When the message traffic is transmitted on the segment $38_a$ the port logic 60 of the port $34_a$ will examine the destination address and note that the destination is located on another segment—in conventional fashion. The input logic 60 will receive the message traffic, place it in the queue 62, and associate it with the VNA ID of that port. The message traffic will be circulated to the other ports of the module 30, each examining first the VNA ID associated with the message. If the VNA ID of the message matches that of the port (i.e., the segment addresses are the same, and a workgroup bit of message is set and matches the same workgroup bit set for the port), the port logic 62 of that port will next examine the destination address of the message to determine if the destination is on the segment of that port. If so, the port logic will see to transmitting the message onto the segment. If not, the port logic will drop the message.

Accordingly, in this example, the port $34_c$ will compare the VNA ID associated with that of the message. The segment addresses will match (since the originating port, port $34_a$, and receiving port, $34_c$, belong to VLAN 1), as will the bits $74_4$ of the workgroup fields 74. Port $34_c$ will then examine the message packet itself, and noting that the destination is (or may be) on the attached segment, and transmit the message packet onto the segment.

All other ports comparing their respective VNA IDs to that of the message packet will either find that the segment address does not match (indicating that the comparing port is of another VLAN), or that the port's workgroup field does not have a bit set to match that of the workgroup field of the message packet.

The VLAN and workgroup assigns described above can extend to other modules 30 within the enclosure 22 at network location 12, or it can extend between the enclosures 22, 24. That is, members of a VLAN/workgroup can be located anywhere within the network location 12.

But, even if a VLAN/workgroup assignment is within an enclosure (e.g., enclosure 22) the responsibility of keeping track of which ports are located in what VLAN assignments can be daunting. This stems from the fact that as presently available, the DragonSwitch module can be combined within a single enclosure with seven (7) other like modules. If each module has 16 ports, an enclosure can have up to 128 ports.

Figure 4:
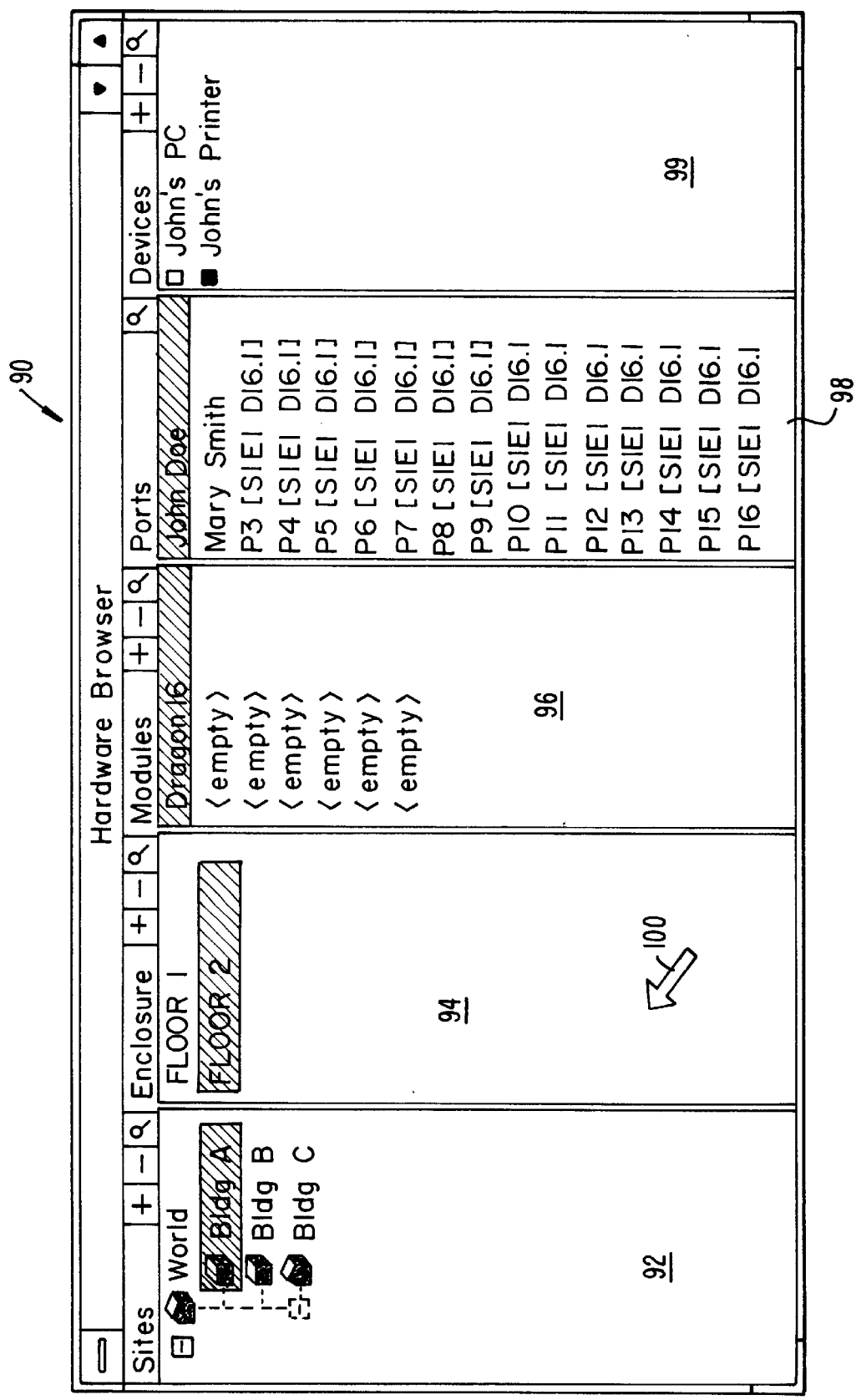
FIG. 4 is a display representation of a portion of the network shown in FIG. 1.

Referring now to FIG. 4 there is illustrated a window presentation 90 that would be presented on the display screen 46 of network management station 40 (FIG. 1) to provide one with an informational view of the hardware components of the network 10. The window presentation 90 is, in turn, divided into a number of sub-windows or window portions labelled "Sites" (sub-window 92), "Enclosure" (sub-window 94), "Modules" (sub-window 96), "Ports" (sub-window 98), and "Devices" (sub-window 99).

Selection of items displayed in the window presentation 90 uses a arrow-head pointer icon 100, movable on the display screen 46 by the pointing device 50. As is customary, moving the pointing device 50 will effect concomitant movement of the pointer icon 100 on the display screen 46 and the window presentation 90.

The sub-window 92, Sites, displays a hierarchical listing or view of: the network locations 12–16 that make up the "world" of network 10. Here, it can be seen that network locations 12–16 are identified as "Building A," "Building B," and "Building C." A point-and-click selection of one of the identified network locations can be effected by positioning the pointer 100 on (or in close proximity with) the desired network location (e.g., Building A—as represented in FIG. 4) and "clicking" the button 51 of the pointing device 50 will select (and high-light such as by reverse video) that network location as is illustrated in FIG. 4 (in which Building A) is selected. That selection will, in turn, display the components of the selected network location in the other sub-windows 94, 96, 98, and 99.

Thus, displayed in "Enclosure" sub-window 94 are, as the label of that sub-window implies, the enclosures (by name) that form or are included in enclosures 22 (labelled here "Floor 1") and 24 ("Floor 2"). Moving the pointer to select (and high-light) one of the enclosures (i.e., Floor 2) high-lights and selects for viewing in sub-window 96 the component parts, here switch modules, that are included in that selected enclosure. In FIG. 4, sub-window 96 shows that, in fact, only one switch module, "Dragon 16," is contained in the Floor 2 enclosure; the locations in that enclosure that could contain switch modules are empty—and identified as such.

Again, a switch module can be selected by moving the pointer 100 to the module name ("Dragon16") for a point-and-click selection to display the 16 ports of that switch module in the ports sub-window 98. If desired, the ports may be named in the manner shown in FIG. 4: ports 1 and 2 are identified as "John Doe" and "Mary Smith," while the remaining ports (port 3, port 4, etc.) are identified by number together with an identification of the location of that port in the network 10 (e.g., "S1E1 D16.1" identifies each port as being located in Site1 (i.e., Floor 2), Enclosure 1, module D16.1.)

Again, a point-and-click selection operation can be made on any of the ports listed in the Ports sub-window 98, high-lighting the selected port to show the selection. The Devices sub-window will then display the elements coupled to the media segment 38 (FIG. 1) connected to the selected and highlighted port.

In order for there to be meaningful information concerning devices connected to a port to be presented for viewing, the devices must be detected and reported. This is done by having the ports 34 monitor communication on their associated media segments and maintain a table of an attribute of the communication that identifies a device and/or distinguishes that device from other devices on the same segment—such as a media access control (MAC) address or internet protocol (IP) address. That table of attributes would then be reported, together with the VNA ID of the associated port, to the network management station, for display, for example, using display window 90.

If the attribute used is a MAC address, it could be presented for viewing, for example in the Devices sub-window 99, in hexadecimal for (3C9A . . . 2). A more meaningful representation could be assigned so that the identification of a device is viewed as shown in FIG. 4 in which the point-and-click selection of the port labelled "John Doe" in Ports sub-window 98 causes to be shown in the Devices sub-window 99 the devices at least seen by the port: "John's PC" and "John's Printer."

Figure 5:
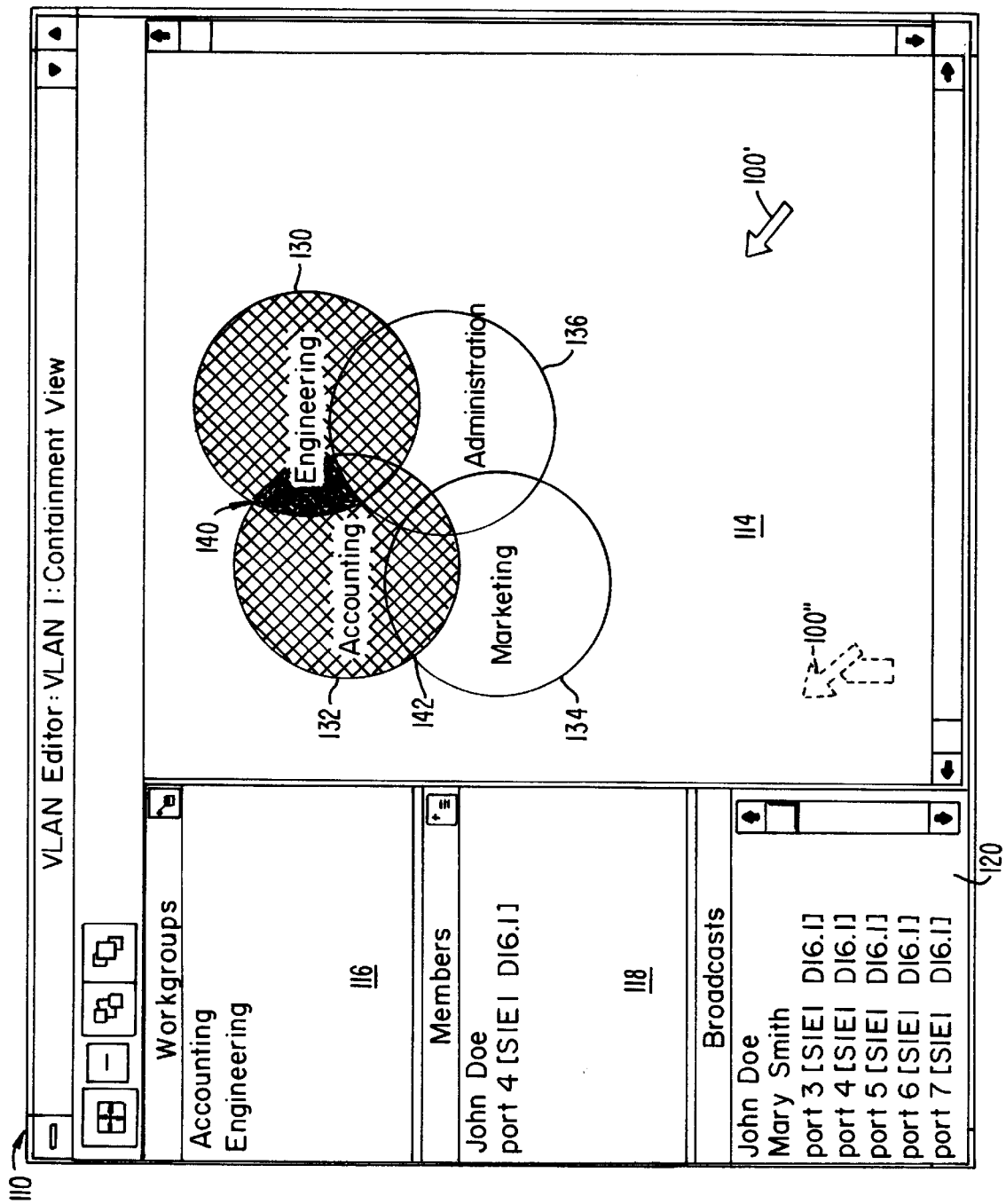
FIG. 5 is display presentation of a visualization, according to the present invention, of the workgroups of a selected virtual network shown is FIG. 4.

If one wanted to see the makeup of another network location (other than Building 1), one would only have to move the pointer 100 to execute a point-and-click select operation on another of the network locations in the hierarchical list of "World" to select the desired network location (e.g., Bldg B, etc.), and the sub-windows 94, 96, and 98 would respectively display the Enclosures, Modules, and Ports forming the network location.

Where FIG. 4 illustrates a technique for presenting information about the hardware components that form the network 10. A companion window display, shown in FIG. 5, offers a view of information concerning the virtual networks that have been constructed. (The discussion of which VLAN, if more than one, to select for viewing by the window presentation illustrated in FIG. 5 is discussed below with reference to FIG. 6.) Illustrated in FIG. 5 is a "Containment View" window presentation 110 that includes four sub-windows 114, 116 (labelled "Workgroups"), 118 (labelled "Members"), and 120 (labelled "Broadcasts"). Sub-window 114 presents a view of a number of geometric shapes (here, circles), each corresponding to and representing a workgroup of a selected VLAN, here, VLAN 1. Four workgroups are represented as being included in VLAN 1: Engineering (geometric shape, or circle, 130), Accounting (circle 132), Marketing (circle 134), and Administration (circle 136). As with FIG. 4, the window presentation 110 is used with a pointer 100' (which would be the same pointer as pointer 100 if both window presentations 90 and 110 were displayed on the display screen 46 at the same time). By using the pointer 100' to execute a point-and-click selection operation of one of the circles (where it does not overlap another circle) the selected circle is high-lighted such as by cross-hatching as illustrated in FIG. 5. A point-and-click operation to select an intersection or overlapping area on two or more circles, such as the overlap 140 of circles 130 and 132, will high-light (by darkening) the selected intersection, and the circles themselves by cross-hatching as illustrated in FIG. 5.

But, by using the point-and-click select operation, more than just high-lighting a workgroup representation circle is accomplished; the selection also effects presentation of information about the selected workgroup or workgroups in the other sub-windows 116–120. Accordingly, with the Accounting and Engineering workgroup representations 130, 132 selected and high-lighted as illustrated in FIG. 5, the Workgroups sub-window 116 will display the identification(s) of the selected workgroup (or workgroups if more than one) chosen for high-lighting in the sub-window 114 by point-and-click selection. The Broadcasts sub-window 120 displays the members (by port identifications) of the selected workgroup(s) high-lighted. The Members sub-window 118 displays the identification(s) of those ports, if any, that are members of both selected (and high-lighted) workgroups. For example, the point-and-click selection of workgroup representations 130, 132 shown in FIG. 5 has high-lighted (by darkening, as indicated) the intersection or overlapping area 140 of the two workgroup representations to indicate that the represented workgroups do share member ports. Displayed in the Members sub-window 118 are those ports that do hold membership in both workgroups: the ports labelled "John Doe" and "port 4."

Figure 6:
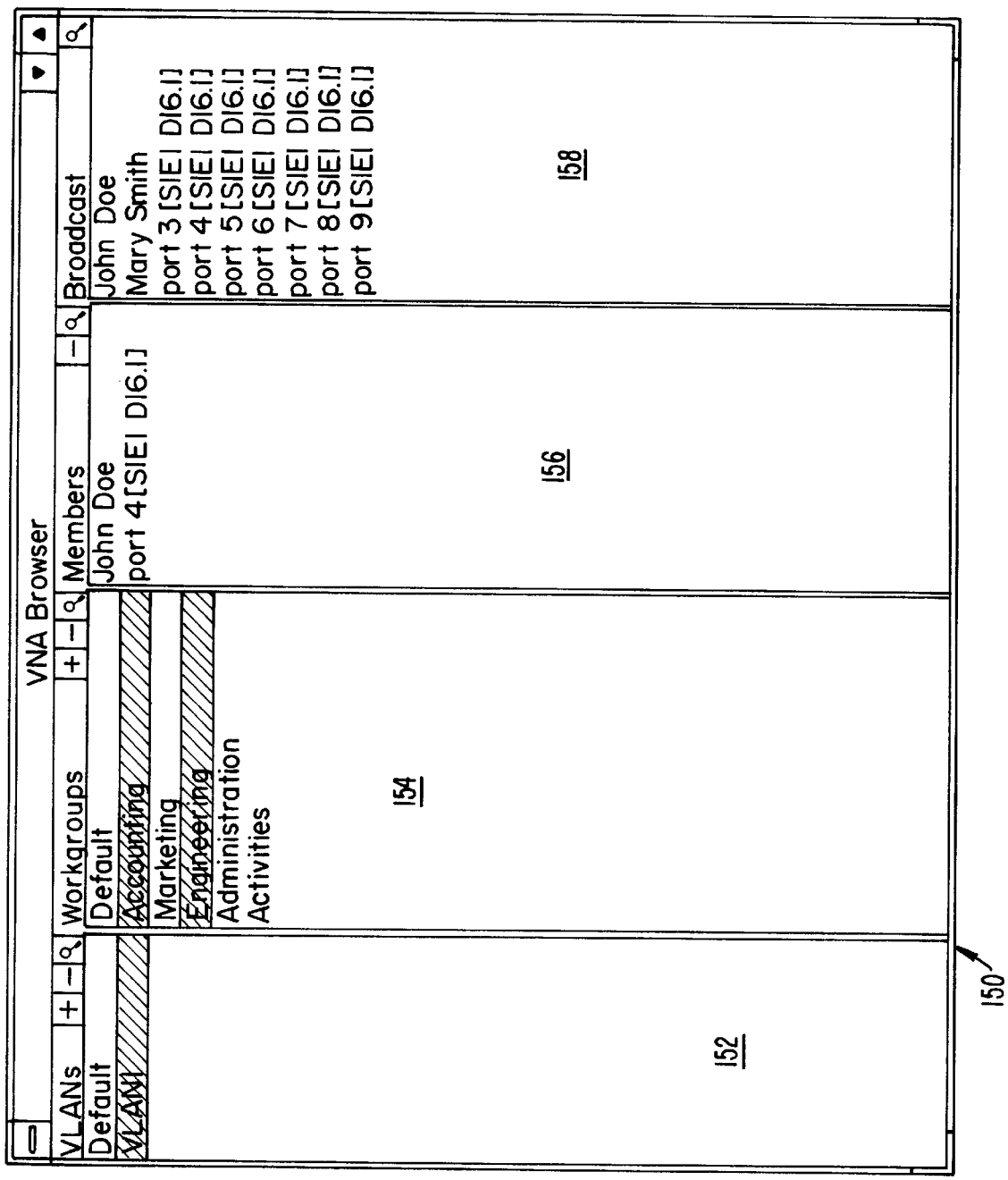
FIG. 6 is a presentation of a visualization of the virtual networks of a network, and the workgroups and members of workgroups of a virtual network selected for viewing.

The description thus far has assumed only one VLAN: VLAN 1. However, it will be seen that there may well be more than one VLAN established on the network 10 that must be managed. Thus, FIG. 6 illustrates a window presentation 130 used to chose among the different VLANs that may exist. The window presentation 150 is divided into five sub-windows 152, 154, . . . , 158, each labelled as shown.

Sub-window 152, labelled "VLANs," will display the various VLANs that may exist on network 10. Here, only two are shown: VLAN 1 and Default. Point and click selection on one of the VLANs will high-light that choice (e.g., here VLAN 1 has been chosen and is shown high-lighted). The sub-windows 154–158 then show information about the selected VLAN.

Sub-window 154, labelled "Workgroups" presents the workgroups that comprise the selected VLAN, VLAN 1: Engineering, Marketing, Administration, and Accounting. One may make a point and click selection to high-light one or more of the workgroups presented in the Workgroup sub-window 154, to show, in the "Members" sub-window 156, the members of the high-lighted workgroup. Here, two workgroups have been selected: Accounting and Engineering. Accordingly, the Members sub-window 156 presents only those ports holding membership in both workgroups, in effect filtering out those ports holding membership in only one or the other of the workgroups.

The selection of two workgroups in the Workgroups sub-window 154 uses a normal point-and-click operation selection for the first selected workgroup (i.e., the Accounting workgroup), and an extended selection for the second or subsequent selection(s). Extended selections are made in conjunction with the use of an additional facility, such as predetermined key of the keyboard 48 of workstation 40, to indicate that an extended selection is intended. Preferably, the "control" key typically found on keyboards is used. The control key of the keyboard 48 would be depressed at the same time the button is depressed for effecting a point and click selection of a second or subsequent workgroup.

The Broadcast sub-window 158, however, will display all ports holding membership in at least one of the workgroups selected for viewing in the sub-window 154.

For example, referring to FIG. 5, the pointer 100' would be placed over,or in juxtaposition with, a port identification either in the Members sub-window 118, or the Broadcasts sub-window 120. The button 51 of the pointing device 50 is depressed and held in the depressed position to "pick up" the desired port. The representation of the pointer changes from that shown as 100' to, for example, the pointer icon shown in phantom as 100" to represent the pick-up of the port. The pointing device 50 may then be manipulated to move the pointer icon 100" to an overlapping position with one or another of the workgroup representations 130–136, and the button 51 released to "drop" the port in the workgroup, changing its membership accordingly. Alternatively, the pointer icon 100" could be moved to an overlapping position with one of the intersections such as the intersection 140, and button 51 released to "drop" the selected port in both the Engineering and Accounting workgroups representations 130, 132.

In similar fashion, ports holding dual workgroup membership, such as the ports identified as "John Doe" and "port 4," shown in the Members sub-window 118 as holding membership in both accounting and engineering, can have their memberships changed. For example, selecting the port identified as John Doe for a drag-and-drop operation to remove it from the Engineering workgroup by moving the pointer icon 110" (often point-and-click selection) to overlap only Accounting before releasing button 51. Thereby, the port John Doe's membership in the Accounting workgroup is cancelled, but its membership in the Engineering workgroup retained. The identification of port (John Doe) will disappear from the Members sub-window 118, but remain in Broadcasts sub-window 120. (If the port identification of John Doe had been subjected to a drag-and-drop operation that left it in, for example, the Administration workgroup only, the John Doe identification would disappear from both the Members and Broadcasts sub-windows 118, 120, appearing only in the Broadcasts sub-window 120 if and when the Administration representation were selected by a point-and-click operation for viewing.

Further, a port (e.g., port 6) which as window presentation 120 shows, has membership in either the accounting or engineering workgroups, could have its membership changed, assigning it membership in three workgroups: Accounting, Marketing, and Administration. To do so, the pointer 110' would be moved to make a point-and-click selection of the port 6 identification in the Broadcasts sub-window 120, button 51 depressed to select the port (concomitantly changing the icon to that shown as 100"), and dragging-and-dropping the selection in the intersection 142 of the workgroup representations Accounting, Marketing, and Administration.

Window presentation 120 may also be used to determine who is in any individual workgroup. Thus, for example, pointer 110' would be moved to make a point-and-click selection of the Accounting workgroup representation 132 (making sure that the pointer 100' does not select an intersection of the accounting workgroup representation 132 with any other workgroup representation). The Accounting representation will remain cross-hatched, as shown, but the Engineering workgroup representation 130 will become blank, in the manner that Marketing and Administration are presently illustrated in FIG. 5. Then, a click-and-point selection of the intersection area 142 between the Accounting, Marketing, and Administration workgroup representations 132, 134, 136 will result in those three representations taking on a cross-hatched appearance, the intersection area 142 becoming highlighted (darkened) in the manner now shown for the intersection area 140, and the Engineering workgroup representation 130 becoming blank (except where overlaid by the accounting and administration workgroups 132, 136). The identification of port 6 will appear in the Members sub-window 118, together with the identifications of all other ports, if any, having joint membership in the three workgroups. The Broadcasts sub-window 120 would, of course, display the identifications of the ports holding membership in any of the three workgroups.

Any such membership change would be accompanied, or substantially immediately followed by, a change in the VNA ID for the port (or ports) in question. The CPU 42 (FIG. 1) of the workstation 40 would generate the necessary instructions, identifying the port whose membership has been changed as a result of the operations described above. The instructions would be delivered to the module 30 carrying that port. The module 30 would then modify the port's corresponding VNA ID to write the workgroup field 74 accordingly.

Of course, the same procedure can be used to switch a port's affiliation with a VLAN. For example, referring to the window representation 150 of FIG. 6, as described above, the accounting and engineering workgroups of VLAN1 have been selected by point-and-click operations to display (1) in the Members sub-window 156 the identifications of those ports (John Doe and port 4) holding dual membership in the accounting and engineering workgroups. And, in the Broadcasts sub-window 158, those ports holding membership in either one or the other (or, in the cases of John Doe and port 4, both) of the accounting and engineering workgroups are identified. To change a port's virtual network affiliation, a second version (not shown) of the VLAN window representation 150 must be called up on the display screen 46 (FIG. 1) of workstation 40. That second window will, of course, display in the VLANs sub-window 152, both virtual networks of the network 10: Default and VLAN1. In that second window (not shown), a point-and-click operation is made to select the "Default" VLAN, highlighting the Default identification. This will cause the Workgroups sub-window of that second VLAN window representation to show the workgroups of the selected "Default" VLAN. One or more of the display workgroups of that second VLAN window representation may then be selected and highlighted by point-and-click operation(s), and the members of that workgroup will be displayed in the Members sub-window. If, for example, the port identified and shown in the Broadcast sub-window 158 (FIG. 6) as Mary Smith is desired to be moved from the VLAN1 virtual network to the Default virtual network (shown in the second sub-window), a point-and-click, drag-and-drop operation is made on the Mary Smith identification in the Members sub-window 158 of the first window presentation 150 (FIG. 6), and "dropped" in the Members sub-window 156 of the second window presentation (not shown).

Only the Members window is a drop zone; the VLANs, Workgroups, and Broadcast sub-windows 152, 154, 158 are not droppable. Accordingly, it is preferable that the icon used to show the drag-and-drop operation change when over these sub-windows, such as by a circle with a line through it, appearing normal only over a droppable zone, the Members sub-window 156.

Figure 7:
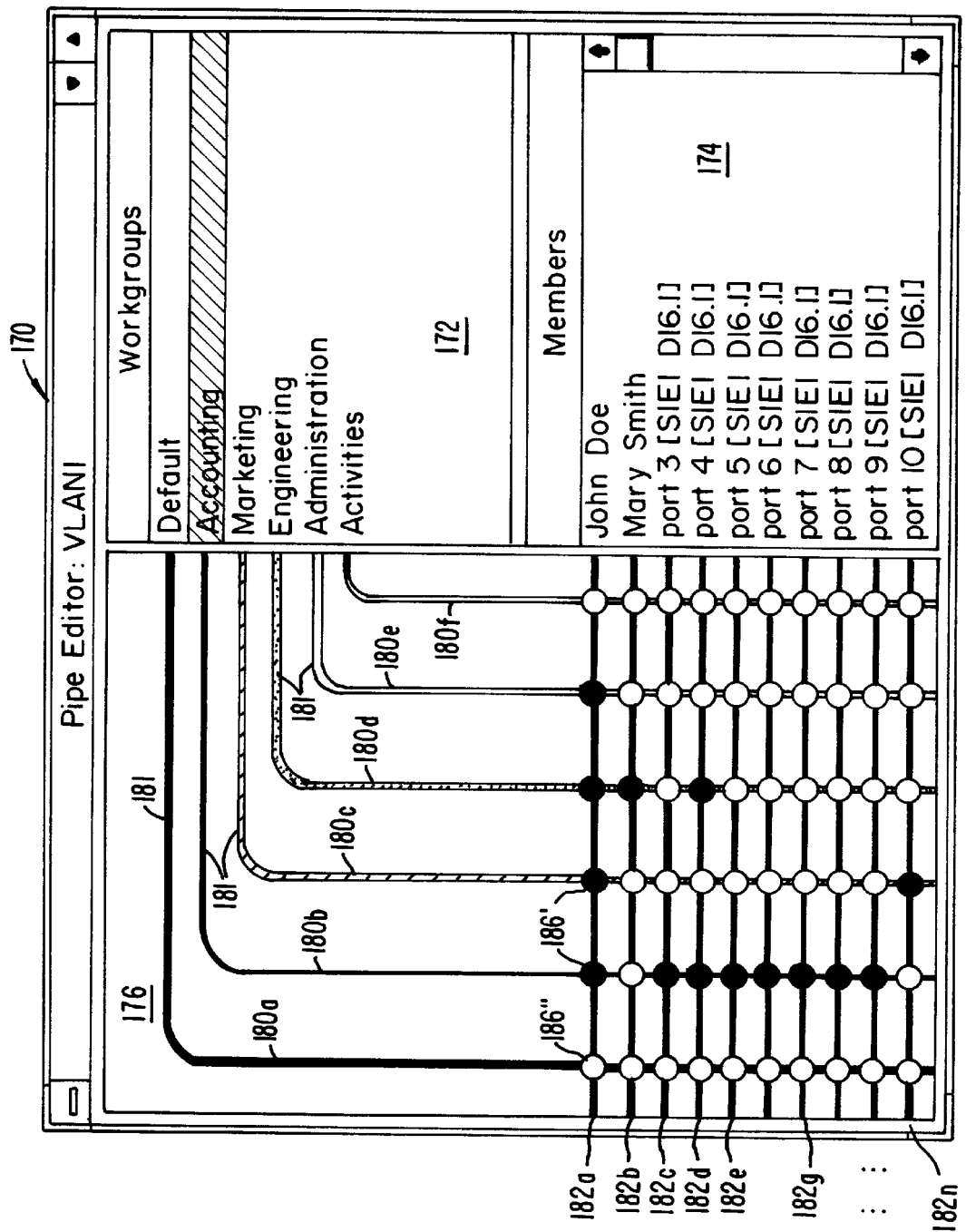
FIG. 7 is an alternate presentation used to show workgroups and their members, and to establish and/or terminate membership in workgroups.

Illustrated now in FIG. 7 is an alternate display of the workgroup and their membership of a virtual network selected for viewing in the window representation 150 of FIG. 6. FIG. 7 is a display of "many-to-many" and "one-to-many" relationship information. Displayed information provides a view of the groupings of elements (here, workgroups) and the elements (here, members of workgroups) and their relationships at a glance. Where, as here, an element can be a member of a number of groups, and a group can contain many member elements, the display of information of FIG. 7 provides one with a simultaneous modelling of both the many-to-many and one-to-many relationships. As FIG. 7 shows, a window representation 170 is sub-divided to include three sub-windows: a Workgroups sub-window 172, which presents the identifications of the workgroups of a selected virtual network, a Members sub-window 176, displaying the identifications of the ports holding membership in the workgroups shown in the workgroups sub-window 172, and a interconnection sub-window 176 that shows the interrelationships between that displayed in the Workgroups and Members sub-windows 172, 174.

The interconnection sub-window 176 is used to establish, or terminate, membership of a port in a workgroup, as well as showing that membership, or lack of membership. Two sets of lines or "pipes," 180, 182 each containing a pipe for each workgroup or member, are positioned to overlap for illustrating interrelationships of the groups the sets of pipes represent. The vertical set of pipes 180 include a horizontal portion 181 having a distal end positioned in juxtaposition to the workgroup (in sub-window 172) it represents. Each workgroup connection 180 (180a, 180b, . . . , 180f) thus corresponds to one of the workgroup identification, Default, Accounting, . . . , Activities, respectively. The horizontal set of interconnection pipes, 182 (182A, 182B, . . . , 182N), similarly have distal ends positioned proximate a respective one of the port identifications displayed in the members sub-window 174. At the overlapping portions of the sets of interconnection pipes 180, 182 are circular icons 186 that are used to show the relationship or lack of relationship, between the Member and Workgroup groups. An icon 186 that is darkened, such as illustrated at 186' at the overlap of pipes 180b, 180c, and 182a, represents workgroup membership. Thus, the port identified as John Doe is represented as holding membership in four workgroups: Accounting, Marketing, Engineering, and Administration; it is also shown as having no membership in the Default and Activities workgroups by the absence of darkening in the icon 186.

In similar fashion, the port identified as Mary Smith is shown as holding membership only in the Engineering workgroup, while port identified as port 3 is shown as holding membership only in the Accounting workgroup, and port 4 holds membership in both the Accounting and Engineering workgroups.

Window representation 170 allows memberships in workgroups to be made or terminated merely by point-and-click selections of the intersections. Thus, for example, if ports 5 and 7, both shown as presently holding membership only in the Accounting workgroup, were to also be included in the Activities workgroup, a point-and-click selection would be made on the (blank circle) interconnection between horizontal interconnection pipe 182e, vertical interconnection pipe 180f to assign port 5 membership in the Activities workgroup, and likewise a point-and-click selection on the intersection between the horizontal interconnection pipe 182g, vertical interconnection pipe 180f, to establish membership in the Activities workgroup for port identification port 7.

Conversely, membership can be terminated by a point-and-click operation on a darkened intersecting point or circle, which will then become blank.

Figure 8:
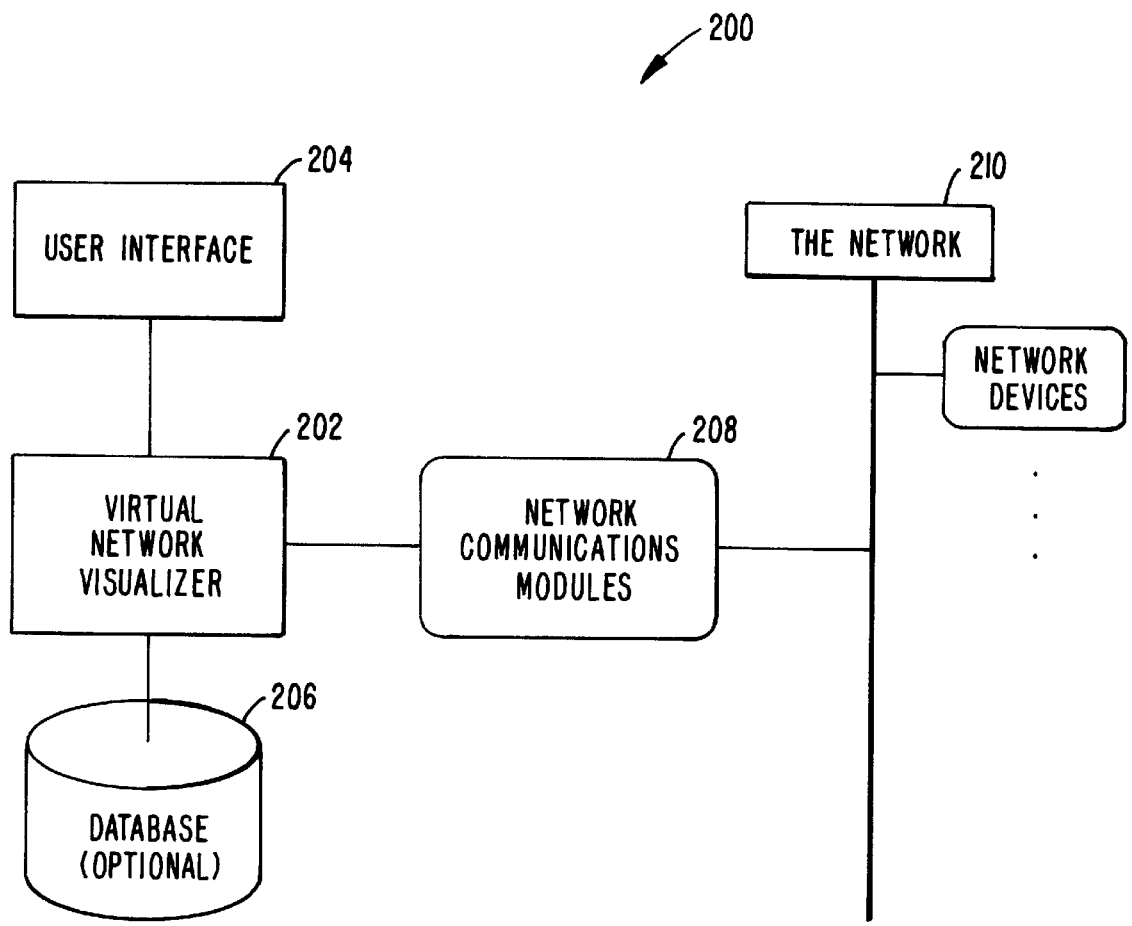
FIG. 8 is a simplified block diagram of the software architecture used for implementing the present invention.

Turning now to FIG. 8, a simplified block diagram of the software architecture is illustrated. As shown, the architecture, designated with the reference numeral 200, includes four basic parts: a virtual network visualizer (VNV) 202, a user interface 204, a database 206, and a group of network communications modules 208 that provide the software communication link between the VNV 202 and devices of the network 210.

The VNV 202 is written in Microsoft Visual C++ (Version 2.2; available from Microsoft Corporation) and Utah for Windows, Ver. 2.0, a graphical user interface development tool available from ViewSoft, Inc. of Provo Utah. Both are available for the Microsoft Windows NT and Windows 95 systems.

The database 206 contains those persistent aspects of the object representations, and their relationships, that result in the various informational images presented by the user interface 204 (e.g., as shown in FIGS. 5–7).

The network communications modules 208 are a collection of device specific software modules for communicating with various devices on the network.

In summary there has been disclosed methods of displaying information that models set membership (FIG. 5) of elements that may be members of more than one set, or many-to-many/one-to-many relationships (FIG. 7) where an element (port/segment) can be a member of many sets (VLAN/workgroup), and a set can contain many elements. The modelling of set membership display of FIG. 5 displays information of common membership of elements in two or more sets by their overlaps, and presents lists of the member elements of the each displayed set, as well as a list elements holding membership in two or more sets.

While the invention has been disclosed in the context of visualizing the elements of a particular network and their relationships, it should now be apparent that the invention could be used in other environments.

I claim:

1. A method of visually displaying on a video display relationships between a number of entities and a plurality of entity groups, each of the number of entities being a member of one or more of a plurality of entity groups, the method comprising the steps of:

presenting on the video display in a first display window an identification of each of the plurality of entity groups;

presenting on the video display in a second display window an identification of each of the number of entities;

presenting on the video display in a third display window first and second sets of connective representations, each one of the first set of connective representations having first representation portion positionally displayed to indicate correlation with a corresponding one of the plurality of entity groups, each of the second set of connective representations being positionally displayed to indicate correlation with a corresponding one of the number of entities, each one of the first set of connective representations having an overlap portion that is shown overlapping each one of the second set of connective representations; and displaying at each overlap portion indicia to signify whether or not the corresponding one of the number of entities of the overlapped one of the second set of connective representations is a member of the one of the plurality of entity groups corresponding to the overlapping connective representation of the first set of connective representations.

2. The method of claim 1, wherein the each of the first set of connective representations includes a first member having a distal end positioned in juxtaposition with the corresponding one of the plurality of entity groups.

3. The method of claim 2, wherein the first member of each of the first set of connective representations is horizontally positioned for viewing on the video display.

4. The method of claim 3, wherein each of the second set of connective representations is horizontally positioned for viewing on the video display.

5. The method of claim 4, wherein each of the first set of connective representations has a second portion that includes the corresponding overlap portion.

6. The method of claim 5, wherein each of the second portions is vertically displayed on the video display.

7. The method of claim 1, wherein each of the first set of connective representations is shown in a color associated with the corresponding one of the plurality of entity groups.

* * * * *